US007348554B2

(12) United States Patent
Hashimoto et al.

(10) Patent No.: US 7,348,554 B2
(45) Date of Patent: Mar. 25, 2008

(54) MASS SPECTROMETER

(75) Inventors: Yuichiro Hashimoto, Tachikawa (JP); Hideki Hasegawa, Tachikawa (JP); Takashi Baba, Kawagoe (JP); Hiroyuki Satake, Kokubunji (JP); Izumi Waki, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 330 days.

(21) Appl. No.: 11/146,157

(22) Filed: Jun. 7, 2005

(65) Prior Publication Data

US 2005/0269504 A1 Dec. 8, 2005

(30) Foreign Application Priority Data

Jun. 8, 2004 (JP) ............................ 2004-169749

(51) Int. Cl.
*B01D 59/44* (2006.01)
*H01J 49/00* (2006.01)

(52) U.S. Cl. ...................... 250/292; 250/281; 250/282; 250/283; 250/288; 250/291; 250/290; 250/299

(58) Field of Classification Search ................ 250/292, 250/291, 283, 282, 290, 288, 281, 299
See application file for complete search history.

(56) References Cited

U.S. PATENT DOCUMENTS

| | | | | |
|---|---|---|---|---|
| 5,179,278 | A | 1/1993 | Douglas | |
| 5,420,425 | A | 5/1995 | Bier et al. | |
| 5,783,824 | A | 7/1998 | Baba et al. | |
| 6,177,668 | B1 * | 1/2001 | Hager | 250/282 |
| 6,504,148 | B1 | 1/2003 | Hager | |
| 6,627,883 | B2 * | 9/2003 | Wang et al. | 250/292 |
| 2003/0071206 | A1 | 4/2003 | Belov et al. | |

* cited by examiner

*Primary Examiner*—Jack Berman
*Assistant Examiner*—Meenakshi S Sahu
(74) *Attorney, Agent, or Firm*—Reed Smith LLP; Stanley P. Fisher, Esq.; Juan Carlos A. Marquez, Esq.

(57) ABSTRACT

A mass spectrometer includes: an ion source for ionizing a specimen to generate ions, an ion transport portion for transporting the ions, a linear ion trap portion for accumulating the transported ions by a potential formed axially, and a control portion of ejecting the ions within a second m/z range different from a first m/z range, from the linear ion trap portion, and substantially at the same timing as the timing of accumulating the ions within the first m/z range from the transport portion into the linear ion trap portion. The ion transportation portion having a mass selection means for selecting the ions in the first m/z range.

19 Claims, 11 Drawing Sheets

MASS SPECTROMETER

CLAIM OF PRIORITY

The present invention claims priority from Japanese application JP 2004-169749 filed on Jun. 8, 2004, the content of which is hereby incorporated by reference to this application.

BACKGROUND OF THE INVENTION

The present invention concerns a mass spectrometer.

In the following description, mass or m/z means a mass to charge ratio, and a mass range or a m/z range means a range for the mass to charge ratio.

In the linear ion trap mass spectrometer used for proteome analysis, etc., high sensitivity, high mass accuracy, $MS^n$ analysis, etc. are required. Mass spectrometry using the linear ion trap in the prior art is to be described.

In the prior art described, for instance, in U.S. Pat. No. 5,420,425 (Patent Document 1), after accumulation of ions introduced into an linear ion trap, ion selection or ion dissociation is conducted as required. Then, ions are ejected mass selectively from the linear ion trap in the radial direction by scanning a trapping RF voltage. It is described that the mass resolution is improved by superposing a supplemental AC voltage on quadrupole rods in this case. This enables mass analysis at high sensitivity.

In the prior art described in U.S. Pat. No. 6,177,668 (Patent Document 2), after accumulation of ions introduced into a linear ion trap, ion selection or ion dissociation is conducted as required. Then, ions are ejected mass selectively from the linear ion trap in the axial direction by applying a supplemental AC voltage on the quadrupole rods. Mass analysis at high sensitivity is possible by scanning the frequency of the supplemental AC voltage or the amplitude of the trapping RF voltage.

In the prior art described in U.S. Pat. No. 5,783,824 (Patent Document 3), after accumulation of ions introduced into a linear ion trap, ion selection or ion dissociation is conducted as required. Inserted lenses are interposed between quadrupole rods and a harmonization potential is formed on the linear ion trap axis by a DC bias between the inserted lenses and the quadrupole rod. Then, by applying a supplemental AC voltage between the inserted lenses, ions are ejected mass selectively from the linear trap in the axial direction. Mass analysis at high sensitivity is possible by scanning the DC bias or the frequency of the supplemental AC voltage.

Then, a method of measuring neutral loss scan or precursor ion scan in the prior art is to be described.

In a quadrupole time-of-flight mass spectrometer (QqTOF) or a triple quadrupole mass spectrometer (TripleQ), it has been proposed a method of conducting precursor ion scanning. For example, in the prior art described in 'Organic Mass spectrometry, vol. 28, pp 1135 to 1143, 1993' (Non-Patent Document 1), only the ion species having a predetermined modified portion can be screened from a sample where a great amount of chemical noises are present, by the precursor ion scan of scanning the mass (m/z) range of the quadrupole mass filter in the pre-stage (Q1) while fixing the mass (m/z) range for the ion detection in the succeeding stage, or neutral loss scan for scanning the mass (m/z) range of the quadrupole mass filter in the pre-stage while fixing the difference of mass between the detection mass (m/z) range in the succeeding stage and the mass (m/z) range in the quadrupole mass filter at the pre-stage. The method is utilized, for example, for confirming the presence of phosphorylated peptide ion species from a specimen where various peptides are mixed.

In order to enhance an extremely low ion utilization efficiency (herein after referred to as Duty Cycle) of the precursor ion scan or neutral loss scan in the prior art, a method of mass selectively ejecting ions from the linear ion trap has been proposed. For instance, U.S. Pat. No. 6,504,148 (Patent Document 4), a method of accumulating ions in a linear ion trap disposed in the pre-stage of a collision chamber, then, introducing only the ions within a specified mass (m/z) range (exactly, at specified mass to charge ratio) from the linear ion trap into the collision reaction chamber to dissociate ions and then detecting the ions by a TOF or quadrupole mass filter thereby improving the Duty Cycle in the neutral loss scan or the precursor scan.

On the other hand, a method of decreasing the space charge of the ion trap is proposed. For example, in the method of the prior art described in US No. 2003/0071206 A1 (Patent Document 5), a quadrupole mass filter is located at the pre-stage of an ion trap and ions other than those required are previously excluded therein. This can introduce only the specified ions as the target for measurement to the ion trap portion, to moderate the space charge of the ion trap.

Further, a method of decreasing the space charge is proposed. For example, in the method of the prior art described in U.S. Pat. No. 5,179,278 (Patent Document 6), a linear ion trap is located to the pre-stage of the 3d quadrupole ion trap and the ions other than those required are excluded in the linear ion trap based on the information such as previously acquired mass spectrum by the application of a supplemental AC voltage. This can introduce only the specified ions as a target for measurement to the 3d quadrupole ion trap portion to moderate the space charge.

SUMMARY OF THE INVENTION

Also in any of the prior art describes in the Patent Documents 1 to 3, the linear ion trap has a larger ion accumulation capacity (by the number of about $10^6$) than the 3d quadrupole ion trap and can attain relatively high Duty Cycle (=ion accumulation time/(total measuring time) upon $MS^1$ measurement). The Duty Cycle is about 50% at the current typical ion accumulation time of 100 ms and the scan time of 100 ms.

However, even the linear ion trap results in a problem of causing the space charge due to increase of the ion introduction rate and the ion accumulation time. That is, the ion introduction rate will be improved more in the future by the improvement for the ion source or the ion transport region and, correspondingly, this will give rise to a problem of requiring shortening of the ion accumulation time capable of permitting the space charge. Assuming that the ion introduction rate will increase by ten times, the ion accumulation time not causing the space charge will decrease from 100 ms to 10 ms, resulting in a problem that the Duty Cycle lowers from 50% to 9%. Further, in a case where the ion introduction amount increases by 100 times, this results in a problem that the ion accumulation time is decreased from 100 ms to 1 ms and the Duty Cycle lowers from 50% to 1% or less. Further, a high resolution mode, with the mass resolution being improved than usual, is present also at present. In this case, it is necessary to lower the scan speed further and shorten the accumulation time of the ion trap further and, accordingly, the problem that the Duty Cycle lowers to 1% or less has already been present.

Further, in the prior art described in the Non-Patent Document 1 involves a subject that the Duty Cycle is remarkably low upon precursor ion scan and neutral loss scan. For example, in a case of scanning at 1000 amu with the transmission mass (m/z) window of 1 amu for the quadrupole mass filter in the pre-stage, since the ions other than the transmission mass (m/z) window are not utilized, the duty ratio is: 1 amu/1000 amu=0.1%.

Further, in the prior art described in the Patent Document 4, after trapping the ions of a wide m/z (m/z range in the first linear ion trap, ions of predetermined mass are successively introduced into a collision chamber in the subsequent stage. It is to be described below that the same problem as that in the prior art described in Paten Documents 1 to 3 becomes more conspicuous in this case.

It takes about 10 ms for the ion transmission time inside the collision cell. In order to prevent cross-talk, a low scan speed at about 10 ms/amu is generally used for the linear ion trap at the pre-stage. Accordingly, it needs 10 s for the scan at 1000 amu. Since the typical ion introduction rate into the trap is about $10^7$/sec, ions by the number of about $10^8$ are introduced into the linear ion trap during 10 s. When such a great amount of ions are present in the trap, the ions cause the space charge and the mass resolution lowers to about several tens.

To avoid space charge effect from degrading the mass resolution ejected from the linear ion trap, it is necessary to restrict the total amount of ions inside the ion trap below about $10^6$, and only the ions for 100 ms can be accumulated in the ion trap. As a result, the Duty Cycle is about 100 ms/(100 ms+10 s)=1%. In addition, since the typical axial ejection efficiency from the linear ion trap is about 20%, it can be said that the effect of the prior art described in the Patent Document 4 is further smaller. In view of the foregoings, it is suggested that an effective reduction of the space charge is necessary for attaining higher Duty Cycle.

Further, the prior arts described in the Patent Documents 5 and 6 each proposes a method of suppressing the space charge of the ion trap in the subsequent stage. However, in each of them, the m/z transmitting the filter in the pre-stage is fixed in a predetermined mass (m/z) range and the space charge inside the ion trap is decreased by selecting only the ions corresponding thereto in the pre-stage. On the contrary for the method of scanning for wide mass (m/z) range, the existent method described in the Patent Documents 5 and 6 involves a problems that the mass (m/z) range that can be measured is restricted.

The present invention intends to provide a mass spectrometer using a linear ion trap capable of efficiently suppressing the space charge and capable of attaining scanning for a wide mass (m/z) range at a high Duty Cycle and capable of conducting analysis at high sensitivity.

In order to attain the forgoing object, the mass spectrometer according to the present invention has features to be described below.

The constituent A for the mass spectrometer according to the invention comprises an ion source for ionizing a specimen to generate ions, an ion transport portion for transporting the ions, a linear ion trap portion for accumulating the transported ions by a potential formed axially, and a control portion of ejecting the ions within a second m/z range different from a first m/z range from the linear ion trap portion substantially at the same timing as the timing of accumulating the ions within the first m/z range to the linear ion trap portion, in which the control portion conducts control of ejecting the ions mass selectively from the linear ion trap portion by any of voltage application of (1) applying a supplemental AC voltage between at least a pair of linear ion trap rods constituting the linear ion trap portion, (2) applying a supplemental AC voltage to an end lens constituting the linear ion trap portion, and (3) applying a supplemental AC voltage between inserted lenses, the inserted lenses constituting the linear ion trap portion.

The constituent B for the mass spectrometer according to the invention comprises an ion source for ionizing a specimen to generate ions, an ion transport portion for transporting the ions, a linear ion trap portion for accumulating the transported ions by a potential formed axially, a reaction chamber for reacting the ions ejected from the linear ion trap portion with a gas, light or electron, etc. introduced from the outside to the inside and conducting reactions such as decomposing reaction, dissociating reaction and charge reduction reaction from multi-charged ions to lower charged ions, a mass spectrometric portion for mass spectrometry of reaction products formed in the reaction chamber and ejected through the reaction chamber, and a control portion of ejecting the ions within a second m/z range different from a first m/z range from the linear ion trap portion substantially at the same timing as the timing of accumulating the ions within the first m/z range to the linear ion trap portion, in which the control portion conducts control of ejecting the ions mass selectively from the linear ion trap portion by any of voltage application of (1) applying a supplemental AC voltage between at least a pair of linear ion trap rods constituting the linear ion trap portion, (2) applying a supplemental AC voltage to an end lens constituting the linear ion trap portion, and (3) applying a supplemental AC voltage between inserted lenses, the inserted lenses constituting the linear ion trap portion.

In the constitution A or the constitution B, the ion transport portion comprises a mass selection means for selecting the ions within the first m/z range in which (1) the linear ion trap portion ejects the ions mass selectively within the first m/z range within the second m/z range, (2) the linear ion trap portion changes the second m/z range in accordance with the change of the first ion m/z range, (3) the transmission mass (m/z) window within the first m/z range transmitting the ion transport portion by the mass selection means is set (controlled) by the previously measured mass spectrum (mass distribution) of the ions introduced to the linear ion trap portion, (4) the mass selection means is a quadrupole mass filter, and (5) the mass selection means is constituted with a linear ion trap and mass selectively ejects the ions from the ion transport portion, etc.

The constitution C of the mass spectrometer according to the invention comprises an ion source for ionizing a specimen to generate ions, a mass selection means for selecting the ions within a first m/z range, a linear ion trap portion of accumulating the selected ions by the potential formed axially and ejecting the ions mass selectively within the second m/z range different from the first m/z range from the linear ion trap portion substantially at the same timing as the timing for accumulating the ions, and a control portion for conducting control for accumulation of the ions and control for ejecting the ions mass selectively from the linear ion trap portion, in which the control portion conducts control for ejecting the ions mass selectively from the linear ion trap portion by any of voltage application of (1) applying a supplemental AC voltage between at least a pair of linear ion trap rods constituting the linear ion trap portion, (2) applying the supplemental AC voltage to the end lens constituting the linear ion trap portion, (3) applying a supplemental AC voltage between inserted lenses, the inserted lenses constituting the linear ion trap portion and, further, the mass selection means is constituted with a quadrupole mass filter portion having quadrupole rods.

According to the invention, it is possible to provide a mass spectrometer using a linear ion trap capable of efficiently suppressing the space charge and capable of attaining high Duty Cycle and remarkably improving the sensitivity in a case of scanning a wide range of m/z.

DETAILED DESCRIPTION OF THE PREFERRED EMBODIMENTS

EXAMPLE 1

Figure 1:
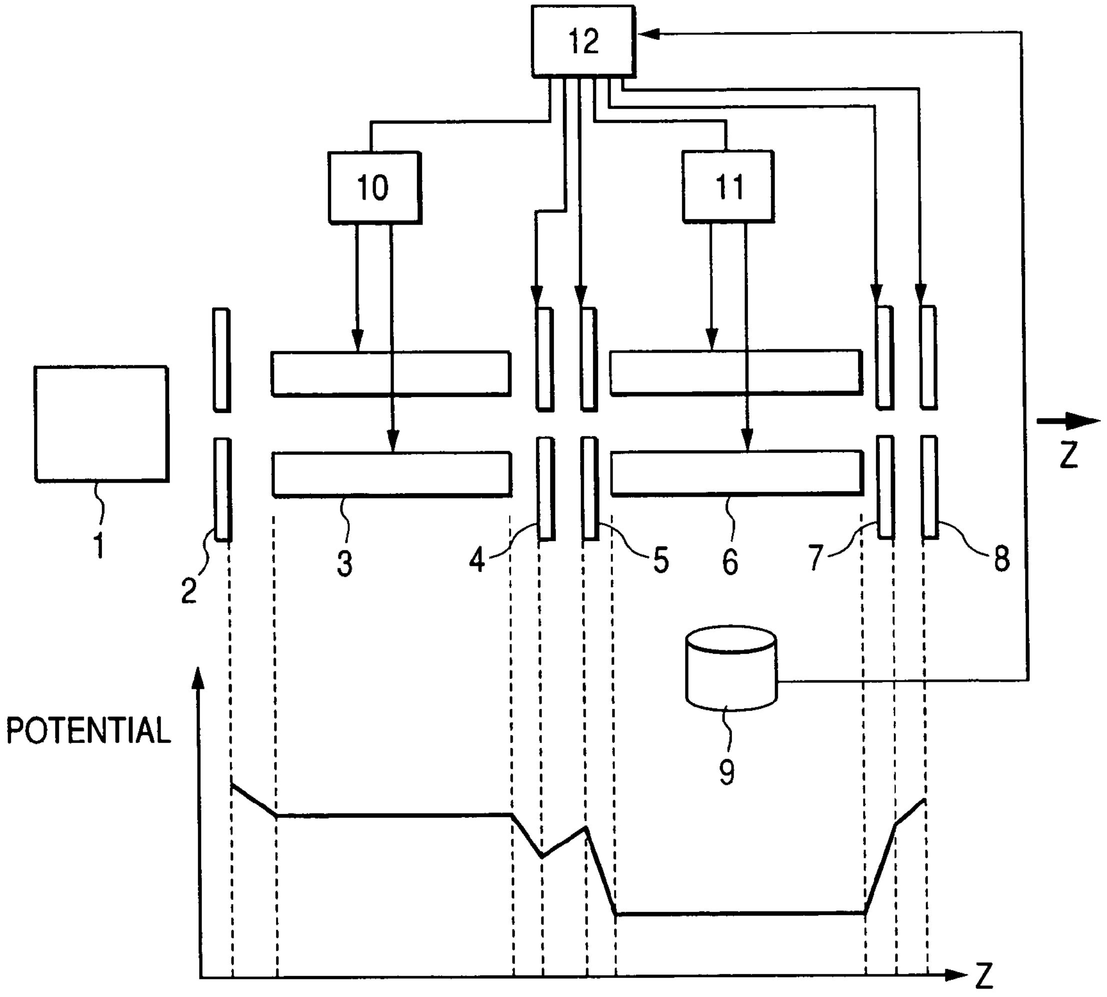
FIG. 1 is a view showing a constitutional example of a linear ion trap mass spectrometer of Example 1 according to the present invention.

FIG. 1 is a view showing a constitutional example of a linear ion trap mass spectrometer of Example 1 according to the present invention. FIG. 1 shows, in the lower part, a potential for each of portions of a quadrupole mass filter and a linear ion trap near the center axis for z axis.

In FIG. 1, as an ion source 1 for ionizing a specimen to generate ions, one of ion sources of an electro spray ion source, an atmospheric pressure chemical ion source, an atmospheric pressure photo-ion source, or an atmospheric pressure matrix assisted laser desorption ion source is used. Ions generated from the specimen in the ion source 1 are passed through a not illustrated differential pumping region and an orifice 2 and introduced to a quadrupole mass filter comprising quadrupole rods 3.

An RF voltage at 1 MHz of about several tens V to several kV at the reversed phase is applied alternately to each of the quadrupole rods 3, and a DC voltage of several tens V to several kV is applied between them. By the application of the voltages, ions within the specified m/z range can pass through the quadrupole mass filter. In a general case of using the quadrupole mass filter alone for mass separation, the transmission m/z window is set to about 0.5 amu to 3 amu.

In Example 1, a broad transmission m/z window of several tens amu to several hundreds amu is set to the quadrupole mass filter. Accordingly, the gas pressure in the region where the quadrupole mass filter is disposed can be set to a wide vacuum range of $3\times10^{-2}$ Torr to $10^{-6}$ Torr. Further, it has been generally known that by conducting ion cooling in the region, energy of the ions is made uniform to improve the trapping efficiency in the linear ion trap at the subsequent stage. For improving the trapping efficiency in the linear ion trap at the subsequent stage, it is most appropriate to set the vacuum degree to about $10^{-4}$ to $3\times10^{-2}$ Torr.

The ions within the specified m/z range selected by the quadrupole mass filter are passed through a gate lens 4, a linear ion trap inlet lens 5 and introduced into the quadrupole electric fields of the linear ion trap formed by the linear ion trap rods 6. A buffer gas is introduced by an appropriate method into the region where the linear ion trap rods 6 are disposed to maintain the vacuum degree to a predetermined value for the range. As the buffer gas, inert He, Ar, $N_2$ etc. are used. In a case of using He as the buffer gas, the vacuum degree is kept at about $10^{-2}$ Torr to $10^{-4}$ Torr and, in a case of using Ar, $N_2$ as the buffer gas, the vacuum degree is kept at about $3\times10^{-3}$ Torr to $3\times10^{-5}$ Torr.

The ions are cooled by collision with the buffer gas in the region where the linear ion trap is disposed and converged radially on a center axis of the quadrupole electric fields formed by the linear ion trap rods 6 (center axis of linear ion trap). A DC bias of about 5V to 30 V relative to the DC bias on the linear ion trap electrodes 6 is applied to the linear ion trap inlet lens 5 and the linear ion trap end lens 7.

The ions are trapped stably inside the linear ion trap by the DC potential on the center axis and by the quadrupole electric field potential formed by the linear ion trap rods 6. By applying the supplemental AC voltage between a pair of opposed linear ion trap rods 6, the ion orbit is enlarged in the radial direction and ions are ejected from the linear ion trap. The ejected ions are detected by a detector 9 and recorded in the memory of a controller (control portion) 12.

The controller (control portion) 12 controls the voltage to be applied to each of the electrodes of the gate lens 4, linear ion trap inlet lens 5, linear ion trap end lens 7, ion stop lens 8 (lens controlling the introduction of ions to the detector 9), and control the power supply (power supply 10 for the quadrupole rod generating a voltage to be applied to the quadrupole rod 3 and a linear ion trap power supply 11 generating a voltage to be applied to the linear ion trap rod 6), and controls the operation sequence of the mass spectrometer.

In the manner similar to the constitution as described above, a supplemental quadrupole rod (not illustrated) may sometimes be inserted between the liner trap inlet lens 5 and linear ion trap end lens 7, and the linear ion trap rods 6 to eliminate so called ‘fringing field’ effects. In this case, a DC bias is applied between the supplemental quadrupole rod and the linear ion trap rods to trap the ions.

In Example 1, the operation sequence of the mass spectrometer is controlled by the method to be described below. For making the difference clear with respect to the prior art, description is at first made to the operation sequence of the apparatus in the prior art (for example upon positive ion measurement).

Figure 2:
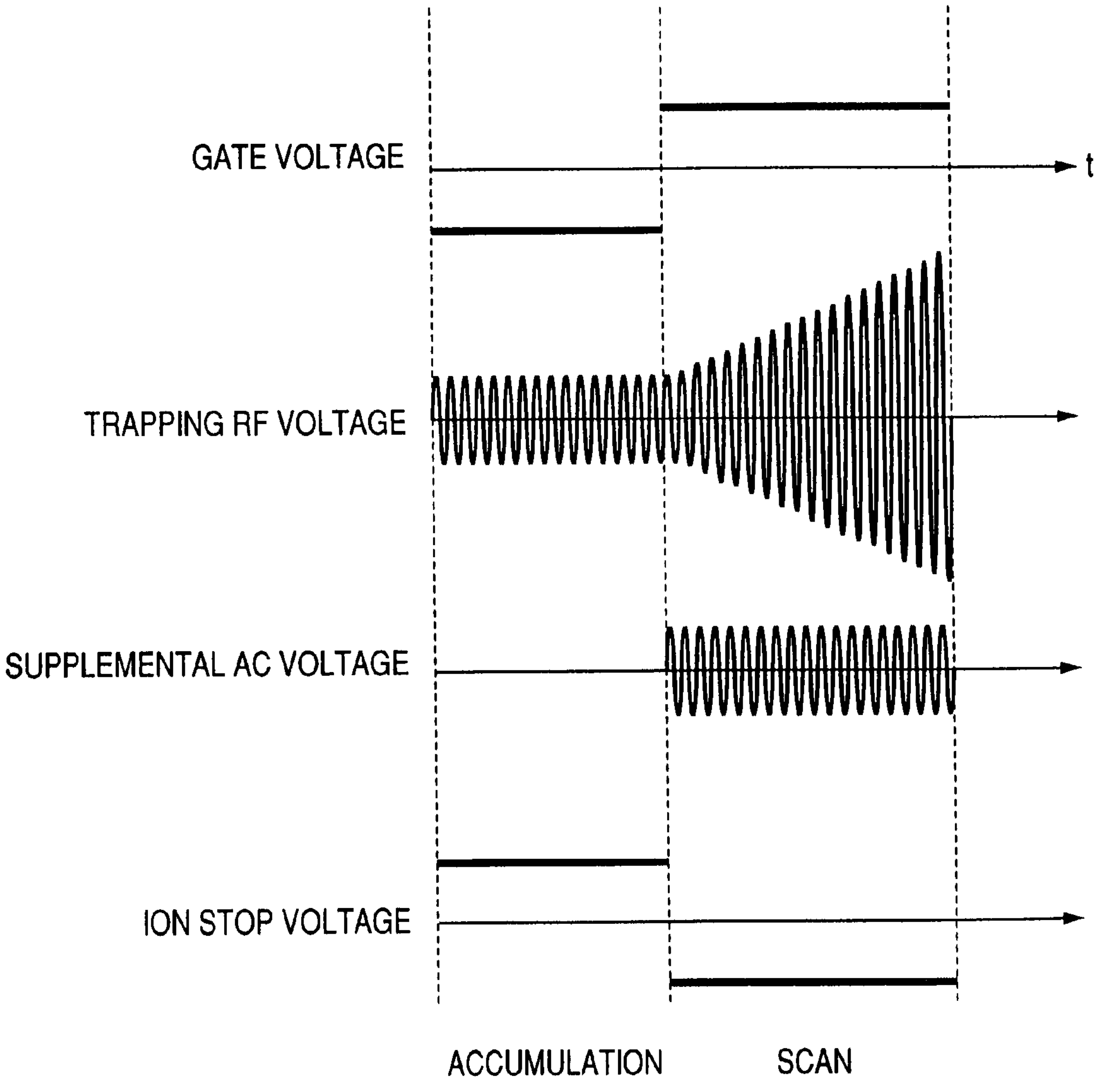
Prior Art FIG. 2
FIG. 2 is a view for explaining an example of a measuring sequence upon positive ion measurement in an apparatus of the prior art.

FIG. 2 is a diagram for explaining the example of the measuring sequence upon positive ion measurement in the prior art apparatus.

In the prior art apparatus, ions are trapped for several ms to several hundreds ms in accordance with the ion strength. During ion accumulation, a negative DC bias of 0V to several tens V relative to the off set potential of the quadrupole rod 3 is applied to the gate lens 4, and a positive DC bias of several V to several tens V relative to the off set potential on the quadrupole rod 3 is applied to the ion stop lens 8. This enables to enter and accumulate the ions to the inside of the ion trap while not introducing the ions to the detector 9.

On the other hand, during mass selective ejection of ions (that is, during scanning) a positive DC bias of several V to several tens V relative to the off set potential on the quadrupole rod 3 is applied to the gate lens 4 and, further, a trapping RF voltage is applied to the linear ion trap lens 6 such that the amplitude value increases with time to conduct scanning under the application of the supplemental DC voltage to the linear ion trap lens 6, and a negative DC bias of several V to several tens V relative to the end lens 7 is applied to the ion stop lens 8.

As described above, in the prior art apparatus, ion trap (accumulation) and mass selective ejection (scanning) of ions were controlled by the voltage applied to the gate lens 4.

Figure 3:
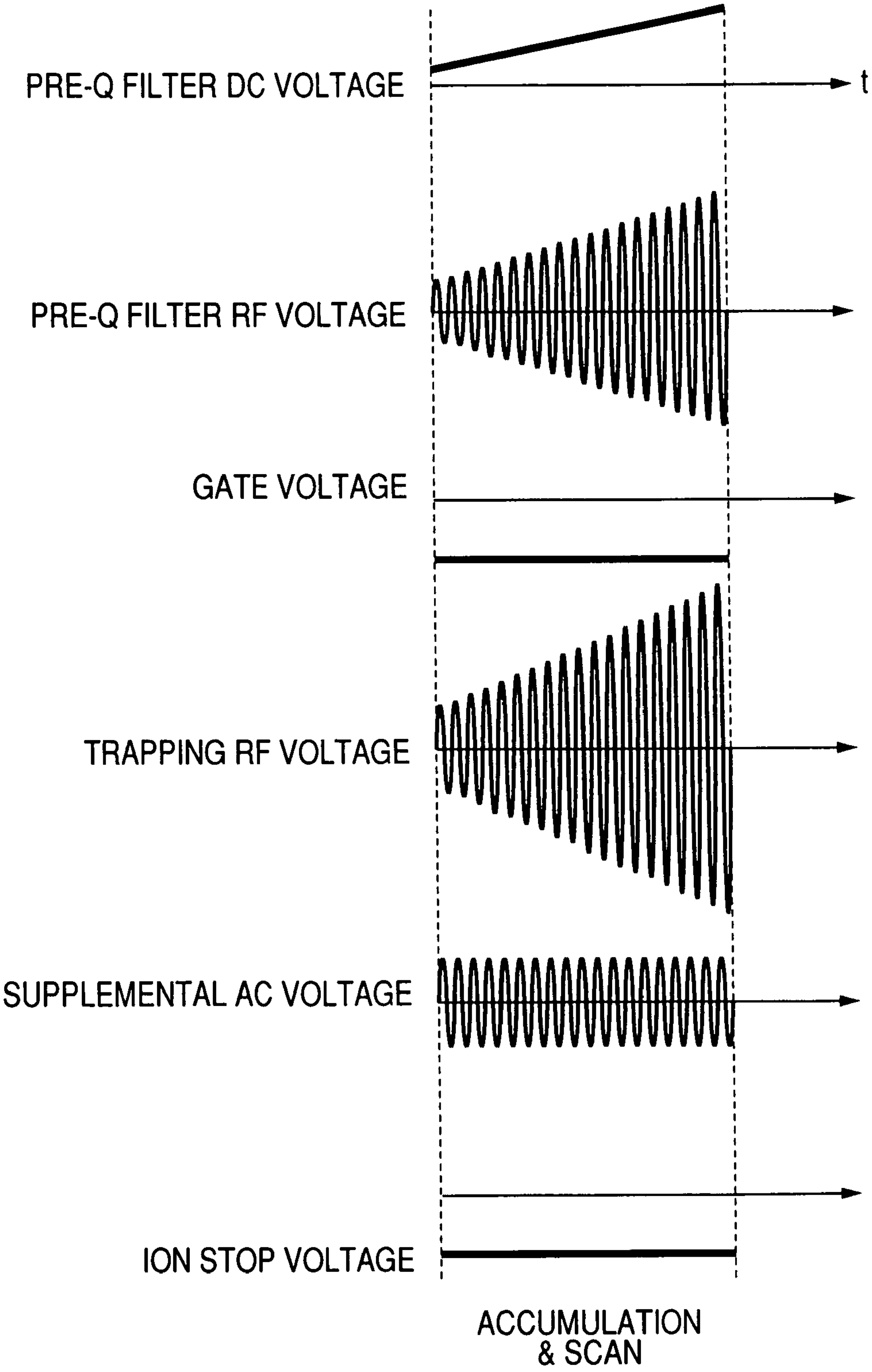
FIG. 3 is a view for explaining an example of a measuring sequence in Example 1 according to the invention.

FIG. 3 is a diagram for explaining an example of the measurement sequence during positive ion measurement in Example 1 of the invention.

In the measurement sequence in Example 1, there is no distinction in view of time for the trap (accumulation) and scanning of ions. Also during ion scanning, the gate lens 4 is set to a low voltage (negative DC bias of 0 V to several tens V relative to the off set potential to the quadrupole rod 3), to conduct ion trapping (accumulation).

By applying a DC voltage that increases with time (pre-Q filter DC voltage) and an RF voltage changing such that the amplitude value of the trapping RF voltage increase with time (pre-Q filter RF voltage) to the quadrupole rod 3, only the ions with m/z window of several tens amu to several hundreds amu (the range being defined as the first m/z range ($M_1$)) are entered to the linear ion trap. At the same time with the application of the DC voltage and the RF voltage to the quadrupole rod 3, the trapping RF voltage is applied such that the amplitude value thereof increases with time to the linear ion trap rod 6 under the application of a supplemental AC voltage to the linear ion trap rod 6 to conduct scanning, while a positive DC voltage of several V to several tens V relative to the off set potential on the quadrupole rod 3 is applied to the ion stop lens 8 such that ions are introduced to the detector 9 thereby inhibiting ions from ejecting in the axial direction.

As described above, appropriate RF voltage and supplemental AC voltage are supplied from the power source 11 for linear ion trap to the linear ion trap rod 6 and ions within m/z range of about 0.2 amu to 3 amu (the range being defined as the second m/z range ($M_2$)) are ejected as to be described later. The supply voltage is to be described specifically. As explained previously, the quadrupole rod power supply 10 and the linear power supply 11 are controlled by the controller 12.

Voltage; VQ(t)sin □Qt+UQ(t), and −VQ(t)cos □Qt−UQ (t) (DC bias component is not shown in the formulae for the voltage) are supplied on every other quadrupole rods 3 shown in FIG. 1 from the quadrupole rod power supply 10. Further, the voltages: VL(t)cos □L t+VS(t)cos ωSt, and −VL(t)cos □Lt, VL(t)cos □Lt, VS(t)cos ω St, and −VL(t) cos □Lt (DC bias component is not shown in the formula for the voltage) is supplied to each of the linear ion trap rods 6 from the linear ion trap power supply 11. In the formulae, t represents the variant of time, and VQ, UQ, □Q, VL, □L VS, and ωS represent quadrupole RF voltage amplitude, quadrupole DC voltage, quadrupole RF angular frequency, trap RF voltage amplitude, trap RF angular frequency, supplemental AC voltage amplitude, and supplemental AC angular frequency, respectively.

Figure 4:
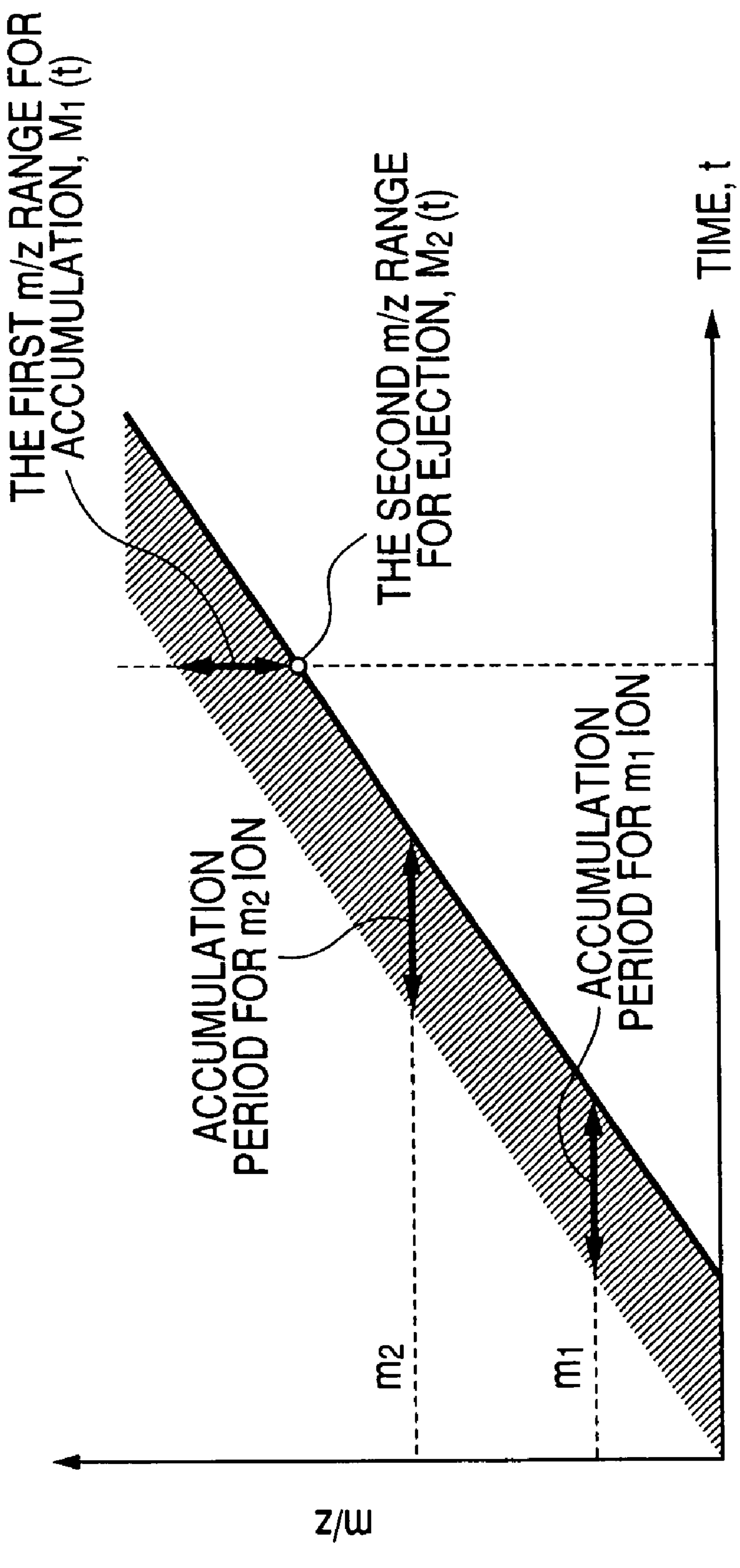
FIG. 4 is a view showing an example of change with time for the m/z range of in-taken ions and for the m/z range of ejected ions in Example 1 according to the invention.

FIG. 4 is a graph showing an example of change with time for the first m/z range ($M_1$) (m/z range for accumulated ion) and the second m/z range ($M_2$) (ejected ion m/z range). In FIG. 4, the ordinate indicates m/z (exactly, mass to charge ratio) and the abscissa indicates the measuring period. In the graph, arrows in the lateral direction represent ion accumulation time relative to the m/z of $m_1$ (herein after means, exactly, mass to charge ratio $m_1/e$) and $m_2$ (herein after means, exactly, mass to charge ratio $m_2/e$). The region of the longitudinal arrow indicates the first m/z range ($M_1$ (t)) and blank circle shows the second m/z range ($M_2$ (t)) at time t.

As shown in FIG. 3, by applying the pre-Q filter DC voltage and the pre-Q filter RF voltage to the quadrupole rods 3 and applying the supplemental AC voltage and the trapping RF voltage to the linear ion trap rods 6, only the ions within the fist m/z range ($M_1$) of about several tens amu to 300 amu are entered to the linear ion trap, while the ions within the second m/z range ($M_2$) of about 0.2 amu to 3 amu are scanned and ejected from the linear ion trap.

As shown in FIG. 4, the first and the second m/z ranges $M_1(t)$ and $M_2(t)$ change with time t. Further, the ion accumulation period is set to each of different timings in accordance with m/z m (for example $m_1$, $m_2$) as shown by hatched line portion in FIG. 4. This can effectively suppress the space charge to improve the Duty Cycle as will be explained below.

In Example 1, different two effects that can not be obtained in the prior art can be attained for suppressing the space charge. For the sake of simplicity, it is assumed here a model in which the distribution for the m/z to ion strength is uniform, the first m/z range (transmission m/z range), ΔL, is constant and the scanning speed is constant.

Figure 5A:
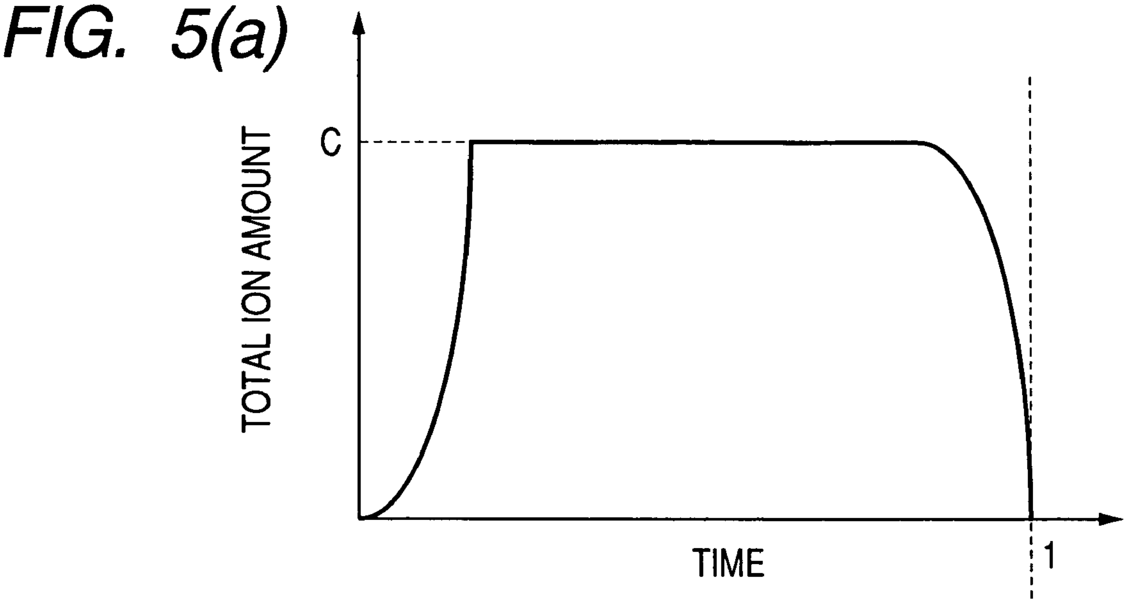
FIGS. 5(*a*) and 5(*b*) are views showing an example of relation between the total ion amount in the ion trap and the time in Example 1 of the invention.
Figure 5B:
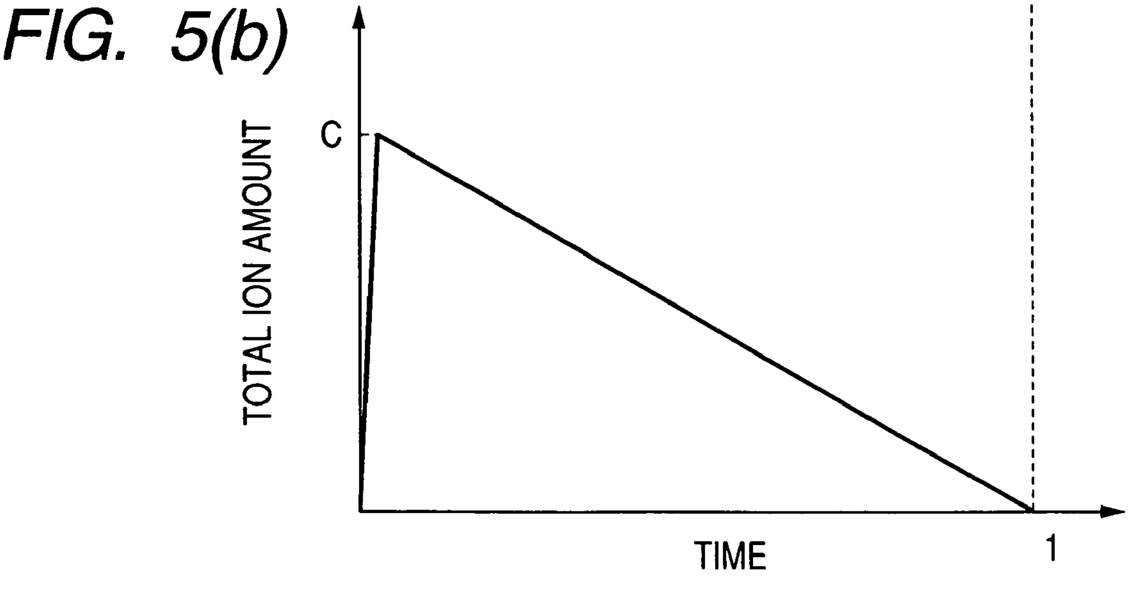

FIGS. 5(*a*) and 5(*b*) are graphs showing an example of a relation between the total ion amount C in the ion trap and the time in Example 1 of the invention. The abscissa in FIGS. 5(*a*) and 5(*b*) indicates the measuring period based on the total measuring period assumed being as 1.

In the prior art shown in FIG. 5(*b*), ions accumulated during scanning decreases monotonously along with the time (measuring period). Since the limit for the space charge is determined by the initial ion amount, a state with a margin for the space charge continues in the latter half of the detection time as a result.

On the other hand, in Example 1 as shown in FIG. 5(*a*), since the total ion amount in the trap is constant substantially over the total measuring period, it can be seen that more ions can be accumulated inside the trap. While it is assume in this model that the limit for the space charge is identical relative to the measuring time or the detection time and the m/z of ions ejected mass selectively, the ion amount permitted for the trap is increased actually as the m/z of the ions ejected mass selectively increases because of increase of the pseudo-potential along with increase in the amplitude of the RF voltage for the linear ion trap. Accordingly, the effect calculated for the model is further increased.

Then, it is considered for the effect of mass selection by the pre-stage quadrupole mass filter. It is assumed that the amount of ion that can be accumulated as C, the ion stream as $I_0$, the total scanning time as $T_0$, the first selection range as ΔL, the total ion range as $L_0$, and $k=T_0I_0/C$. In the prior art, since the Duty Cycle is maximized when the ions are accumulated up to the limit amount for the space charge, it is represented by (equation 1) and (equation 2). k is an index for the space charge.

$$\text{Duty Cycle} = (\text{Trapping Time})/(\text{Total Time}) = (C/I_0)/\{(C/I_0)+T_0\} \quad \text{(equation 1)}$$

$$\text{Duty Cycle} \leqq 1/(1+k) \quad \text{(equation 2)}$$

The index k takes a larger value as the scanning time is longer, the ion introduction amount to the ion trap is larger, or the amount of ion that can be accumulated is smaller. In the existent usual scan mode, $T_0$=100 ms, $I_0=10^7$ m/sec, and $C=10^6$ and k=1 approximately, in which Duty Cycle is ensured by about 50% thus causing no significant problem. However, for obtaining a higher resolution than usual, it is necessary to suppress the amount of trapped ions and scanning at low speed is required. Accordingly, $T_0$=1 s and $C=10^5$, approximately, and k=100, so that the ion Duty Cycle lowers to about 1%. It is expected that the ion source, the differential pumping region, etc. will be improved in the future, and k in the usual measuring mode also tends to increase.

Then, the Duty Cycle in Example 1 is to be derived. The total ion amount Q inside the linear ion trap in Example 1 is represented by (equation 3).

$$Q=(T_0 I_0/2)(\Delta L/L) \quad \text{(equation 3)}$$

For defining the charge amount Q to less than the ion amount C that can be accumulated, the condition of (equation 4) is necessary, and the Duty Cycle in Example 1 is represented by (equation 5). By substituting (equation 4) into (equation 5), (equation 6) is derived as the Duty Cycle of Example 1.

$$(\Delta L/L) \leqq (2/k)^{1/2} \quad \text{(equation 4)}$$

$$\text{Duty Cycle} = (\Delta L/L)T_0/\{(\Delta L/L)T_0+T_0\} = (\Delta L/L)/\{1+(\Delta L/L)\} \quad \text{(equation 5)}$$

$$\text{Duty Cycle} \leqq 1/\{1+(k/2)^{1/2}\} \quad \text{(equation 6)}$$

Figure 6:
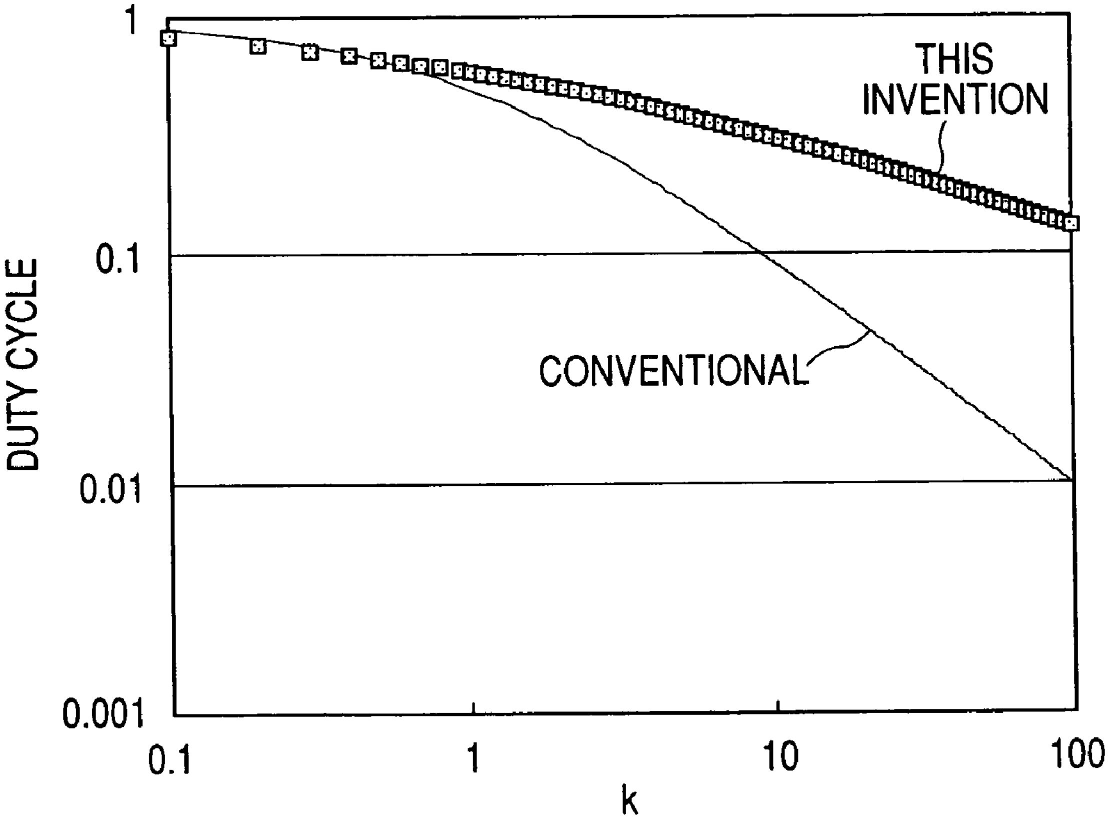
FIG. 6 is a view showing an example of the dependence of the Duty Cycle on k in Example 1 and in the prior art.

FIG. 6 is a graph showing an example of dependence of Duty Cycle on k in the prior art and in Example 1. In FIG. 6, the Duty Cycle in each of the prior art and Example 1 is determined according to (equation 2) and (equation 6), respectively.

In view of FIG. 6, while the Duty Cycle is 1% in the prior art at k=100, the Duty Cycle of about 12% is obtained in Example 1. It is apparent that Example 1 can provide a remarkable effect of improving the sensitively as k increases compared with the prior art.

EXAMPLE 2

Figure 7:
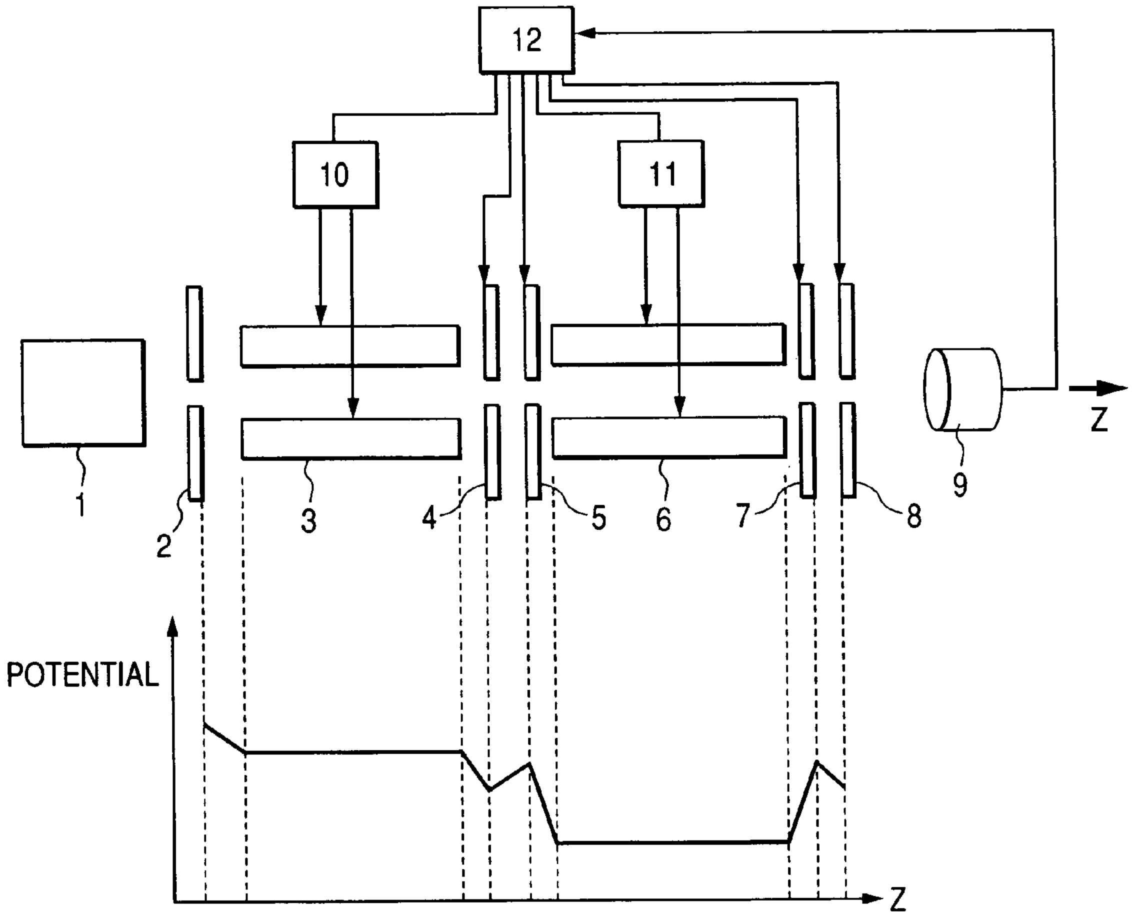
FIG. 7 is a view showing a constitutional example of a linear ion trap mass spectrometer as Example 2 of the invention.

FIG. 7 is a view showing a constitutional example of a linear ion trap mass spectrometer in Example 2 according to the invention. FIG. 7 shows, in the lower part, the potential for each of portions near the center axis of z axis of the quadrupole mass filter and the linear ion trap. Example 2 is different in that ions are mass selectively ejected in the axial direction with respect to example 1. Accordingly, the voltage on the ion stop lens 8 is set lower than the potential on the linear ion trap end lens.

As a buffer gas, inert He, Ar, $N_2$, etc. are used and the pressure inside the linear ion trap is kept about at $10^{-2}$ Torr to $10^{-4}$ Torr for He, and about at $3\times10^{-3}$ Torr to $3\times10^{-5}$ Torr for Ar, and $N_2$. Ions are cooled by collision with the buffer gas and converged on the center axis of the linear ion trap.

A DC bias at about 3V to 5V relative to the DC bias on the linear ion trap rod 6 is applied to the linear ion trap inlet lens 5 and the linear ion trap end lens 7. Ions are trapped stably inside the linear ion trap by the potential gradient on the center axis for the linear ion trap and the radial potential gradient formed by the linear ion trap quadrupole electric field.

Example 2 has a feature that the DC bias voltage on the linear ion trap rod 6 can be applied only to a lower level than that in Example 1 in view of the characteristics of ion ejection. In this case, if the ion energy incident to the linear ion trap has an extension, it may be a possibility that the ions are not trapped but reach as noises to the detector 9. In Example 2, energy conversion in the pre-stage quadrupole mass filter is important, and it is desirable that the pressure in the range where the quadrupole mass filter is disposed is kept at $10^{-3}$ Torr to $3\times10^{-2}$ Torr.

A supplemental AC voltage is applied to the linear ion trap rod 6 or the linear ion trap end lens 7. The resonated ions are mass selectively ejected in the direction of the center axis of the linear ion trap by the fringing field formed by the linear ion trap end lens 7. The ejected ions are detected by the detector 9 and recorded in the controller 12.

Also in Example 2, substantially identical control with that in the measuring sequence shown in FIG. 3 is conducted. As a result, the first m/z range and the second m/z range are set as shown in FIG. 4. Also in Example 2, an outstandingly higher Duty Cycle can be obtained than in the prior art with the same reason as explained for Example 1.

EXAMPLE 3

Figure 8:
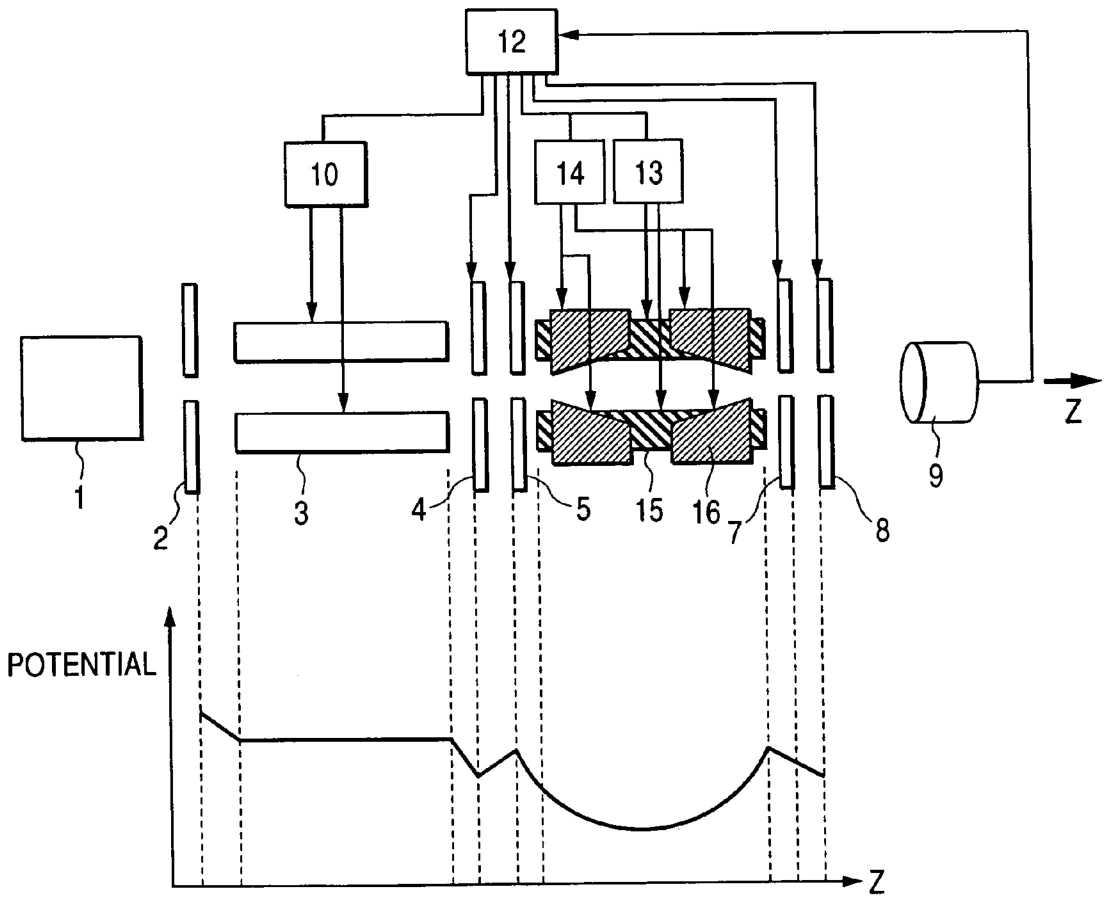
FIG. 8 is a view showing a constitutional example of a linear ion trap mass spectrometer as Example 3 of the invention.

FIG. 8 is a view showing a constitutional example of a linear ion trap mass spectrometer in Example 3 according to the invention. FIG. 8 shows, in the lower part, the potential for each of portions near the center axis of z axis of the quadrupole mass filter and the linear ion trap. An inserted lens 16 is inserted and a DC bias is applied to the linear ion trap rod 15, whereby a harmonic potential can be formed on the axis.

Example 3 has the constitution in which linear ion trap rods 15 are disposed instead of the linear ion trap rods 6 of Example 2 shown in FIG. 7 and the inserted lens 16 is interposed between the linear ion trap rods 15, and a linear ion trap power source 13 for supplying voltage to the linear ion trap rods 15 and a inserted lens power supply 14 for supplying voltage to the inserted lens 16 are disposed. The constitution of introducing the buffer gas into the region where the linear ion trap rods 15 are disposed and the pressure condition inside the linear ion trap are identical with those in Example 2.

The inserted lenses 16 are disposed such that lenses of different length are inserted along the axis in the linear ion trap rods.

By applying a DC bias of several V to several tens V relative to the linear ion trap electrodes 15 on the inserted lens 16, a harmonic potential is formed in the direction of the center axis of the linear ion trap. Details for the shape of the lens are described in the prior art of the Patent Document 3 described previously. Ions resonated by applying the supplemental AC voltage are accelerated in the direction of the center axis of the linear ion trap and ejected mass selectively.

Since the resonance frequency of the ions is in inverse proportion to the square root of the mass (m/z) of the ions, only the specified ions can be ejected. The ejected ions are detected by the detector 9 and recorded in the controller 12.

In Example 3, operation for each of the portions of the apparatus is controlled by the method substantially identical with that for the measuring sequence shown FIG. 3. As a result, it is possible to control such that the first m/z range and the second m/z range are set as shown in FIG. 4. Also in Example 3, an outstandingly higher Duty Cycle than the prior art can be obtained by the same reasons as explained for Example 1.

EXAMPLE 4

Figure 9:
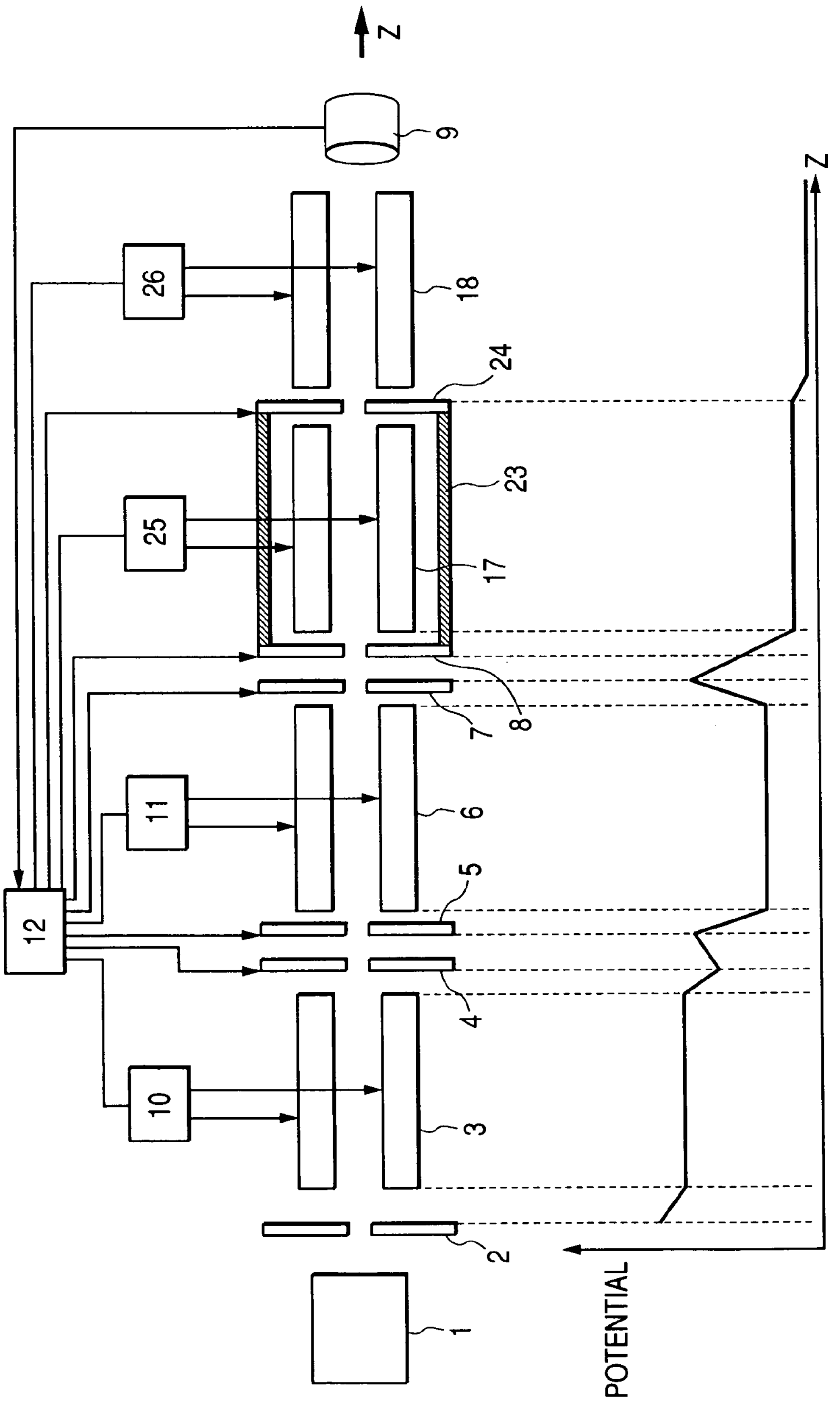
FIG. 9 is a view showing a constitutional example of a linear ion trap mass spectrometer as Example 4 of the invention.

FIG. 9 is a view showing a constitutional example of a linear ion trap mass spectrometer of Example 4 according to the invention. FIG. 9 shows an example of using a triple quadrupole mass spectrometer. FIG. 9 shows, in the lower part, a potential for each of the portions near the center axis of z axis of the quadrupole mass filter, the linear ion trap and the quadrupole rods 17.

The constitution shown in FIG. 9 is substantially identical with the constitution of Example 2 shown in FIG. 7 till the ions formed by the ion source 1 are introduced from the quadrupole mass filter to the linear ion trap. In the constitution shown in FIG. 9, the constitution in which the ions formed by the ion source 1 are introduced from the quadrupole mass filter to the linear ion trap may be identical with the constitution of Example 3 shown in FIG. 8.

Ions mass selectively ejected in the direction from the linear ion trap to the direction of the center axis of the linear ion trap are introduced into a collision chamber 23 where quadrupole rods 17 are disposed, undergo ion dissociation, etc. and are then introduced into the electric fields formed by the quadrupole rods 18.

The collision chamber 23 comprises an ion stop lens 8 for the collision chamber inlet lens on the inlet thereof and a collision chamber end lends 24 on the inlet side thereof. A quadrupole rod power source 25 for supplying a voltage to the quadrupole rods 17, a voltage applied to a collision chamber end lens 24, and a quadrupole rod power source 26 for supplying a voltage to the quadrupole rods 18 are controlled by a controller 12.

Usually, the collision chamber 23 is filled with an inert gas at about 1 mTorr to 100 mTorr introduced from a not illustrated gas introduction system, and a predetermined reaction can also be taken place by adding a reactive gas or the like to the inert gas. It takes from several ms to several tens ms of passing time for passing the ions through the collision chamber 23. A slow scanning speed at several ms/amu to several tens ms/amu is used for preventing cross-talk of ions ejected mass selectively from the linear ion trap. For example, when scanning by 1000 amu at 10 ms/amu, $T_0$=10 s. Since $I_0=10^7$ and $C=10^6$, k=100.

In the prior art disclosed in the Patent Document 4 described previously, the value of k described in Example 1 increases and the Duty Cycle only of 1% or less can be obtained. On the contrary, 12% Duty Cycle can be obtained in Example 4 like in Example 1 described previously. Example 4 is extremely suitable for use in the case where the scanning time is long. Ions dissociated in the collision chamber 23 are converged on the center axis of the quadrupole rods 17 and then introduced to the quadrupole mass filter comprising the quadrupole rods 18 (act as the quadrupole mass spectrometer). In the quadrupole mass filter, precursor scan and neutral loss scan can be conducted by passing the ions of specified m/z. Further, although not illustrated in the drawing, a linear ion trap, a quadrupole ion trap, or the like may also be disposed instead of the quadrupole rod 18 that act as a quadrupole mass filter and the same effects as described in Example 1 can also be provided.

EXAMPLE 5

Figure 10:
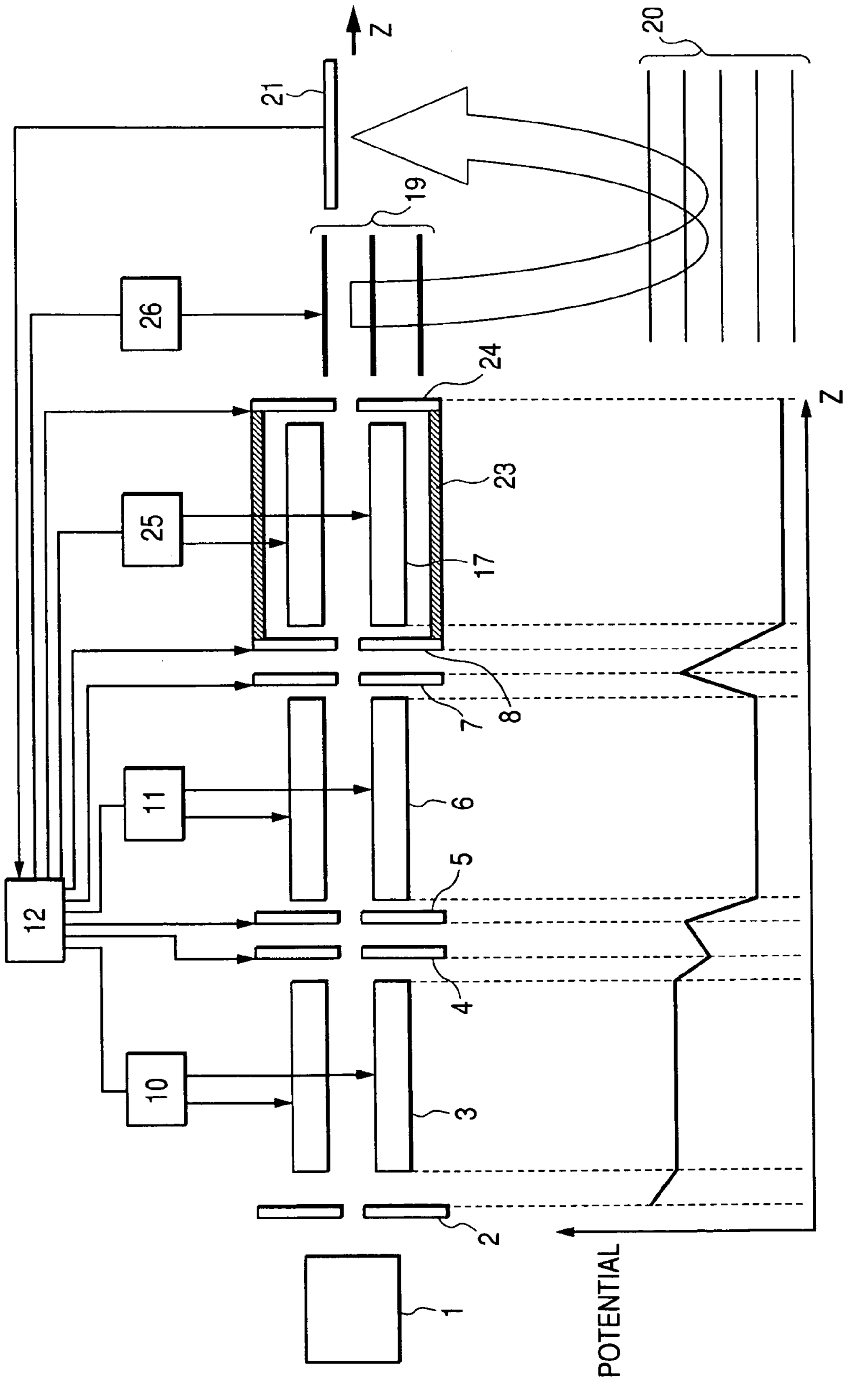
FIG. 10 is a view showing a constitutional example of a linear ion trap mass spectrometer as Example 5 of the invention.

FIG. 10 is a view showing a constitutional example of a linear ion trap mass spectrometer of Example 5 according to the invention. FIG. 10 shows an example of using a time-of-flight mass spectrometer (comprising a pusher 19, a reflectron 20, and a detector (MCP) 21) instead of the quadrupole rods 18 that act as the quadrupole mass filter and the detector 9. FIG. 10 shows, in a lower part, a potential for each of the portions near the center axis of z axis of the quadrupole mass filter, the linear ion trap and the quadrupole rods 17.

The constitution shown in FIG. 10 is substantially identical with the constitution of Example 2 shown in FIG. 7 till the ions formed by the ion source 1 are introduced from the quadrupole mass filter to the linear ion trap. In the constitution shown in FIG. 10, the constitution in which the ions formed by the ion source 1 are introduced from the quadrupole mass filter to the linear ion trap may be identical with the constitution of Example 3 shown in FIG. 8.

Ions ejected from the linear ion trap in the direction of the center axis of the linear ion trap are introduced to a collision chamber 23 where quadrupole rods 17 are disposed and undergo ion dissociation, etc. Usually, the collision chamber 23 is filled with an inert gas at about 1 mTorr to 100 mTorr and predetermined reaction can also be taken place by adding a reactive gas or the like to the inert gas. It takes from several ms to several tens ms of passing time for passing the ions through the collision chamber 23. A slow scanning speed at several ms/amu to several tens ms/amu is used for preventing cross-talk of ions ejected mass selectively from the linear ion trap. For example, when scanning by 1000 amu at 10 ms/amu, $T_0$=10 s. Since $I_0=10^7$ and $C=10^6$, k=100.

In the prior art disclosed in the Patent Document 4 described previously, the value of k described in Example 1 increases to 100 or more and the Duty Cycle only of 1% or less can be obtained. On the contrary, 12% Duty Cycle can be obtained in Example 5 like in Example 1 described previously.

Example 5 is extremely suitable for use in the case where the scanning time is long. Ions dissociated in the collision chamber 23 are converged on the center axis of the quadrupole rods 17 and then introduced to the time-of-flight mass spectrometer.

The ions are accelerated in a pusher 19 controlled by a pusher power source 26 in the direction perpendicular to the center axis of the electric fields formed by the quadrupole rods 17, reflected at a reflectron 20, then detected by a detector 21 comprising MCP, etc. and then the data are sent to a controller 12 and stored in a memory. Although not particularly illustrated in the drawing, a type with no reflectron 20 in FIG. 10, or a multi-reflection type reflectron, etc. can also be used, where the effect as described for Example 1 can also be provided.

Further, although not illustrated, the effects described for Example 1 can also be provided in a case of disposing a Fourier transformation type ion cyclotron mass spectrometer (FT-ICRMS) instead of the TOF portion in FIG. 10.

EXAMPLE 6

Figure 11:
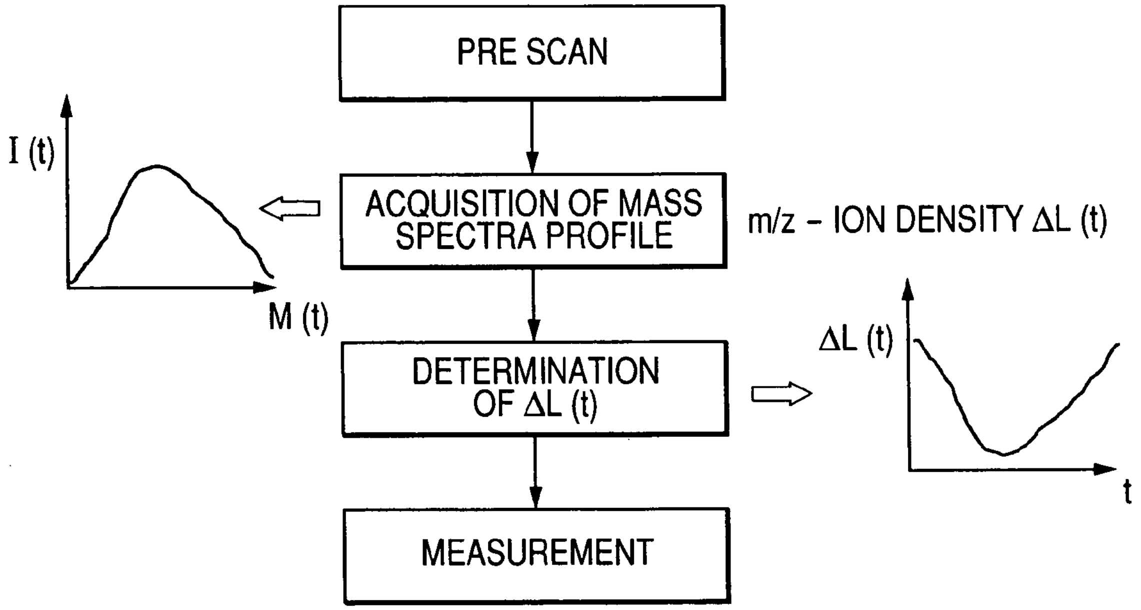
FIG. 11 is a view showing an example of a flow chart for measurement in Example 6 of the invention.

FIG. 11 is a view showing an example of a flow chart for the measurement in Example 6 of the invention.

For the ions introduced to the linear ion trap, while it has been assumed that the distribution of the m/z to ion strength (M(5) to I(t)) is a uniform distribution in Example 1 to Example 5, they are actually not uniform. Then, in Example 6, pre-scanning (preliminary measurement) is conducted prior to the measurement in Example 1 to Example 5 (usual measurement) and mass spectrum was measured to actually acquire the distribution for the m/z to ion strength (M(t) to I(t)) distribution (that is, mass spectral profile) as shown in the diagramon the left of FIG. 11. High scanning speed may be used for the pre-scanning since not so high resolution and sensitivity are required.

The m/z window ΔL for the first m/z range of the ions introduced to the linear ion trap is changed by using the mass spectra profile acquired from the result of the pre-scanning, according to the m/z (that is, scanning time t) based on the data for the ion signal amount relative to the m/z (that is, scanning time t). That is, as shown in the diagram on the right of FIG. 11, the m/z window ΔL(t) is determined setting it narrower for t where the value of the m/z to ion strength (M(t) to I(t)) is larger and, on the other hand, the m/z window ΔL(t) is determined setting it broader for t where the value of the m/z to ion strength (M(t) to I(t)) is smaller.

The total ion amount inside the linear ion trap can be kept substantially constant by the determination for the m/z window ΔL(t) Further, since the total ion amount permitting the space charge differs somewhat also depending on the RF voltage or the resonance frequency, it is possible for feedback control of the information to the m/z window ΔL(t) to use the permissible total charge amount C as a function of the RF voltage. It is also possible to determine the mass spectra profile based on previously measured data and determine the m/z range ΔL(t) with no particular use of the pre-scanning in the same manner as described above.

While the quadrupole mass filter is disposed to the pre-stage of the linear ion trap in Example 1 to Example 5 described above, the same effects can also be obtained by disposing a linear ion trap capable of mass selectively ejecting ions instead of the quadrupole mass filter disposed in the pre-stage. Further, it may also adopt a method of inhibiting introduction of ions to the linear ion trap by the control for the application of the supplemental AC voltage inside the linear ion trap, etc. without disposing the quadrupole mass filter or the linear ion trap in the pre-stage. While the method is advantageous in view of the cost but involves a demerit that the setting for the parameter is complicated.

In Example 2 to Example 5 described above, while a collision chamber to which the gas is introduced is used, it will be apparent that a constitution of irradiating light to conduct optical dissociation or a constitution of irradiating electron beam to conduct electron dissociation may also be adopted instead of the gas.

As has been described above specifically, the mass spectrometer according to the present invention can efficiently suppress the space charge and scan the wide m/z range at a high Duty Cycle thereby capable of providing a mass spectrometer using a linear ion trap capable of analysis at high sensitivity.

What is claimed is:

1. A mass spectrometer comprising:

an ion source for ionizing a specimen to generate ions;

an ion transport portion for transporting the ions;

a linear ion trap portion for accumulating the transported ions; and a control portion of ejecting the ions within a second m/z range different from a first m/z range from the linear ion trap portion, and substantially at the same timing as the timing of accumulating the ions within the first m/z range from the transport portion into the linear ion trap portion.

2. A mass spectrometer according to claim 1, wherein the ions are mass selectively ejected by any of voltage application of (1) applying a supplemental AC voltage between at least a pair of linear ion trap rods constituting the linear ion trap portion, (2) applying a supplemental AC voltage to an end lens constituting the linear ion trap portion, and (3) applying a supplemental AC voltage between inserted lenses, the inserted lenses constituting the linear ion trap portion.

3. A mass spectrometer according to claim 1, wherein the ion transport portion has mass selection means for selecting the ions within the first m/z range.

4. A mass spectrometer according to claim 1, wherein the linear ion trap portion changes the second m/z range in accordance with the change of the first ion m/z range.

5. A mass spectrometer according to claim 3, wherein the mass selection means is a quadrupole mass filter.

6. A mass spectrometer according to claim 3, wherein the mass selection means comprises a linear ion trap.

7. A mass spectrometer according to claim 1, wherein the second m/z range window is narrower than the first ion m/z range window.

8. A mass spectrometer comprising:

an ion source for ionizing a specimen to generate ions;

an ion transport portion for transporting the ions;

a linear ion trap portion for accumulating the transported ions;

a reaction chamber for reacting the ions ejected from the linear ion trap portion;

a mass analysis portion for conducting mass analysis for the reaction products of the ions ejected passing through the reaction chamber; and a control portion of ejecting the ions within a second m/z range different from a first m/z ranges from the linear ion trap portion, and substantially at the same timing as the timing of accumulating the ions within the first m/z range from the transport portion into the linear ion trap portion.

9. A mass spectrometer according to claim 8, wherein the ions are mass selectively ejected by any of voltage application of (1) applying a supplemental AC voltage between at least a pair of linear ion trap rods constituting the linear ion trap portion, (2) applying a supplemental AC voltage to an end lens constituting the linear ion trap portion, and (3) applying a supplemental AC voltage between inserted lenses, the inserted lenses constituting the linear ion trap portion.

10. A mass spectrometer according to claim 8, wherein the ion transport portion has mass selection means for selecting the ions within the first m/z range.

11. A mass spectrometer according to claim 8, wherein the linear ion trap portion changes the second m/z range in accordance with the change of the first ion m/z range.

12. A mass spectrometer according to claim 10, wherein the mass selection means is a quadrupole mass filter.

13. A mass spectrometer according to claim 10, wherein the mass selection means comprises a linear ion trap.

14. A mass spectrometer according to claim 8, wherein the second m/z range window is narrower than the first ion m/z range window.

15. A mass spectrometer comprising:

an ion source for ionizing a specimen to generate ions;

a mass selection means for selecting the ions within a first m/z range;

a linear ion trap portion for accumulating therein the selected ions by a potential formed in the axial direction and mass selectively ejecting therefrom the ions within a second m/z range different from the first m/z range substantially at the same timing as the timing for accumulating the ions; and a control portion for conducting control of accumulating the ions and control of mass selectively ejecting the ions from the linear ion trap portion.

16. A mass spectrometer according to claim 15, wherein the control portion conducts control for mass selectively ejecting the ions from the linear ion trap portion by any voltage application of (1) applying a supplemental AC voltage between at least a pair of linear ion trap rods constituting the linear ion trap portion, (2) applying supplemental AC voltage to an end lens constituting the linear ion trap portion, and (3) applying a supplemental AC voltage between inserted lenses, the inserted lenses constituting the linear ion trap portion.

17. A mass spectrometer according to claim 1, wherein the first m/z range is from several tens amu to several hundreds amu, and the second m/z range is from 0.2 amu to 3 amu.

18. A mass spectrometer according to claim 2, wherein a trapping RF voltage increasing with time is applied to mass selection means of the ion transport portion, a DC voltage lower than an offset potential of the mass selection means is applied to the inserted lens, and a DC voltage higher than the offset potential of the mass selection means is applied to the end lens.

19. A mass spectrometer according to claim 2, wherein a trapping RF voltage increasing with time is applied to mass selection means of the ion transport portion, a DC voltage 0 V to several tens V lower than an offset potential of the mass selection means is applied to the inserted lens, and a DC voltage several V to several tens V higher than the offset potential of the mass selection means is applied to the end lens.

* * * * *